July 13, 1965   J. A. YOUNG ETAL   3,194,283
METHOD OF SHAPING WIRE SCREEN
Original Filed Sept. 1, 1959   2 Sheets-Sheet 2
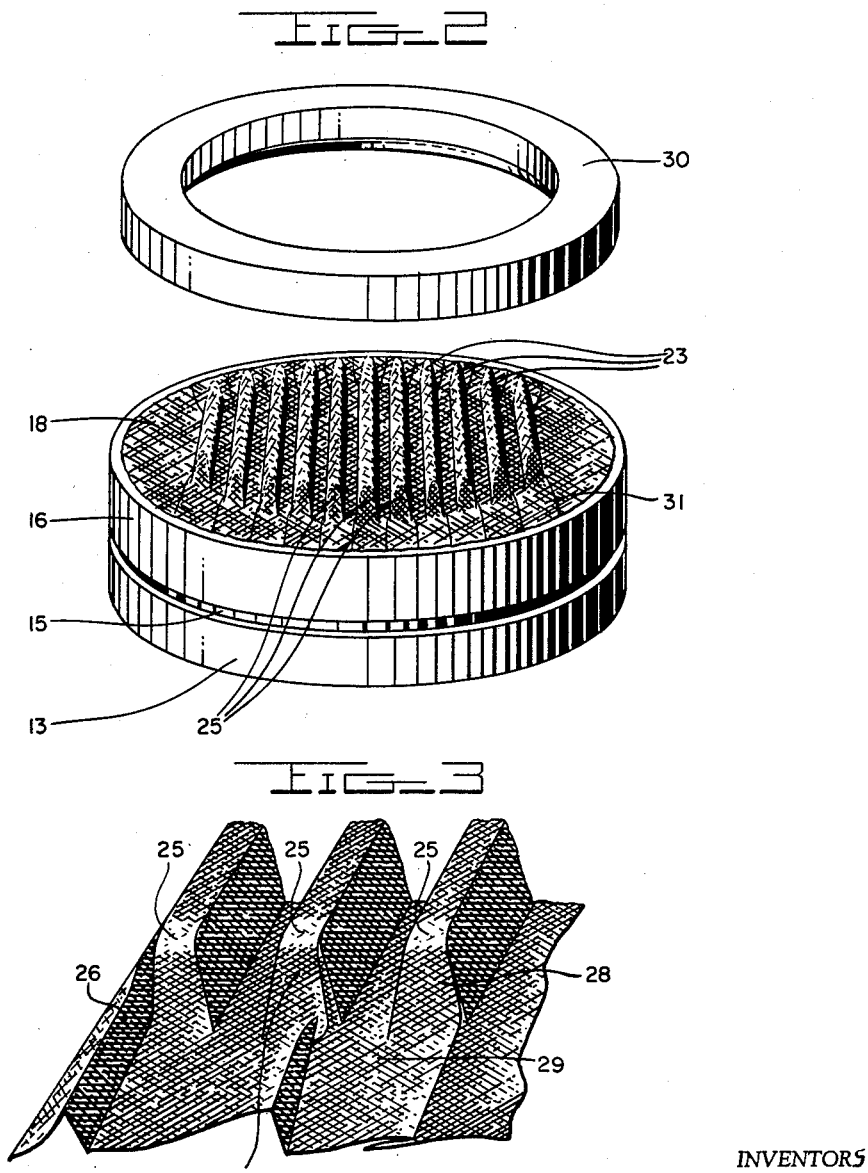
INVENTORS
JAMES A. YOUNG
ROBERT T. LUCAS
BY *Richard C. Reed*
ATTORNEY ३,१९४,२८३
METHOD OF SHAPING WIRE SCREEN
James A. Young, Washington, D.C., and Robert T. Lucas, Alexandria, Va., assignors to the United States of America as represented by the Secretary of the Navy
Original application Sept. 1, 1959, Ser. No. 837,562. Divided and this application Aug. 30, 1960, Ser. No. 53,017
3 Claims. (Cl. 140—107)
(Granted under Title 35, U.S. Code (1952), sec. 266)

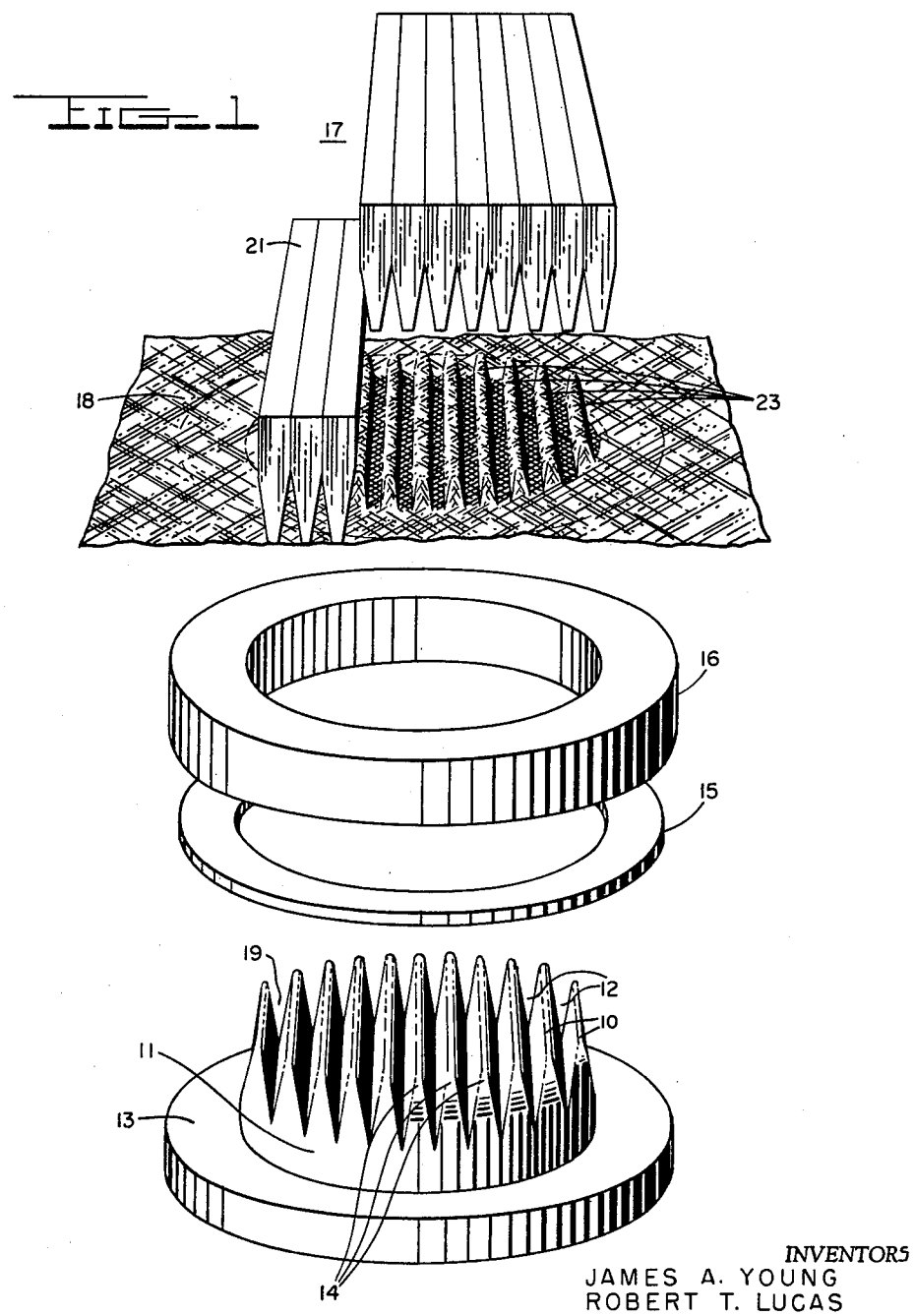

The invention described herein may be manufactured and used by or for the Government of the United States of America for governmental purposes without the payment of any royalties thereon or therefor.

This application is a division of application Ser. No. 837,562, filed September 1, 1959, which has matured into Patent No. 3,069,831, dated December 25, 1962.

The present invention relates to a shaped wire screen and to the method of shaping the same.

The usual punch and die methods for shaping a unitary sheet are impractical for carrying out the present design in a wire screen, since the wire screen cannot withstand the strains of more resilient materials. It has also been considered extremely difficult to provide a sufficient number of raised ridges in a wire screen because of the need for preserving a substantially uniform mesh size in the final product.

The present invention provides for a wire screen member which is shaped by successive indentations of dies across the face of the work piece in carrying out a ridge-and-groove patern, and the strains on the wire screen are substantially minimized and uniformly experienced in a single direction. There is in the final product, moreover, a uniform mesh size which is attributed to the effectiveness of the present method.

An object of the present invention resides in the method for shaping the wire screen without tearing or deforming the wire mesh. Another object of the invention is to provide a relatively simple method for permanently affixing a raised corrugated structure in a wire screen.

A further object is to provide a corrugated wire screen member which finds application as a matrix for molding filter elements of identical structure and as a supporting element in filtration.

Other objects and advantages of the invention will hereinafter become more fully apparent from the following description of the annexed drawings, which illustrate a preferred embodiment, and wherein:

FIG. 1 is an exploded view of the apparatus after the corrugations have been formed in the wire screen;

FIG. 2 illustrates the shaped wire screen on the die block after the ends of the corrugations have been lapped over and pressed against the margin; and FIG. 3 shows, in an enlarged view, the stepwise manner of lapping the open ends of the corrugations.

Beginning now the description of this invention, an exploded view of the apparatus for shaping a wire screen into a series of corrugations is shown in FIG. 1. The die block 11 which may be cast or machined comprises a series of equally spaced parallel grooves 12, dividing the central cylindrical prominence of the block into tapered ridges 10 and surrounding this central prominence is a flat annular margin 13. The die block illustrated herein is grooved to form eleven (11) tapered ridges; each groove reaching to a depth of 11/16 of an inch. However the number of ridges and the depth of the grooves are not restricted to those of the illustrated embodiment but said die configurations may be varied to any desired specification. The top of said ridges are rounded somewhat, while their lateral ends are curved substantially to provide a uniformly curved outer edge, as shown at 14.

Annular spacer elements, such as the one shown at 15, of any desired thickness, may be inserted on the margin below abutment ring 16 in order to adjust the die to any desired corrugation depth in the wire screen. Abutment ring 16 when placed into position over the spacer becomes the level to which wedge dies 17 may descend into the grooves.

A bronze wire screen 18, or one of any other suitable metallic material is initially annealed to provide a more flexible screen and it is then formed on the die block 11 by inserting wedge dies 17 successively over the wire screen into grooves 12. For example, beginning with groove 19, the wedge die 21 depresses the wire screen into groove 19 until said die comes to rest on the abutment ring. Each of the other wedge dies 17 is then pressed in succession into each adjacent groove, and each additional portion of the screen thus formed is subjected to compressive action in a single direction. The edges of said dies are blunted sufficiently to prevent sharp contact with the screen within the grooves; the dies retain the formations in the grooves without creasing or deforming the wire mesh. The wedge dies remain in their inserted position until every groove is filled, and when the wedges are removed, as illustrated in FIG. 1 the depressions remain in the wire screen and produce a corrugated surface 23.

The open ends of the corrugations are then lapped on the curved edge 14 of the die block to form closed ends, as illustrated in FIGS. 2 and 3. The end of each corrugation is initially covered with a layer of wire screen by compressing one side of the corrugation, and the remaining fold of wire screen is then creased and laid over the first layer of wire screen. It must now be explained that the crease is taken on one side of the corrugation, as shown in FIG. 3, the side chosen is the one nearer the center line. Explaining further, the enlarged view shows the screen pressed against the lateral surface 25, the fold is drawn out and pressed together to form crease 26, the folded screen is then brought over the lateral surface 25, as shown at 27, and it is finally pressed and smoothed out against the marginal area at 29. Care should be exercised to avoid overlapping the folds from two adjacent ends and also to prevent any folding or wrinkling of the wire screen on the lateral surface 28. It will be noticed in FIG. 2 that by creasing the corrugated ends on the side nearer the center line and by lapping the ends away from the center line, the folded screen forms a uniform pattern with respect to the center line.

Finally, press ring 30 is brought down on the margin to compress the marginal folds 31 and form a smooth, flat surface. The wire screen is then trimmed to any desired marginal width 18. The shaped wire screen is then removed from the die block and a layer of nickel or other suitable plating metal is electroplated thereon. Nickel plating provides a wire screen of more rigid form, and the nickel plated screen becomes more resistant to any acid media that may pass through the screen. A bronze screen originally of 60 mesh when plated with nickel will produce a plated screen of approximately 80 mesh.

The present shaped screen member may be used as a matrix for producing aerosol filter elements and may be used for this purpose in the manufacture of glass filter units as disclosed in the aforementioned Patent No. 3,069,-831, entitled "Aerosol Filter."

It is of course understood that the foregoing disclosure relates to a preferred embodiment of the invention and that numerous modifications or alterations may be made therein without departing from the spirit and scope of the invention as set forth in the appended claims.

What is claimed is:
1. The method of shaping a wire screen member of a given mesh comprising positioning a wire screen on a die block having a series of parallel grooves, depressing successive portions of said wire screen with a series of wedge dies by inserting each of said dies successively over said wire screen into an adjacent groove to substantially maintain said given mesh and form thereby a series of parallel corrugations in said wire screen, removing said inserted wedge dies from said series of grooves to expose said corrugations, lapping the end of said corrugations by bending said wire screen from one side of each corrugation to form an end surface, pressing said wire screen together to form a longitudinal crease near the crest of each corrugation, laying said pressed wire screen over the end surface thereof, and flattening said pressed wire screen to form a flat marginal area beyond said corrugations.

2. The method of shaping a wire screen member of a given mesh comprising positioning a wire screen on a die block having a series of parallel grooves, depressing successive portions of said wire screen with a series of wedge dies by inserting each of said dies successively over said wire screen into an adjacent groove to substantially maintain said given mesh and form thereby a series of parallel corrugations in said wire screen, removing each of said dies from said series of grooves and lapping the ends of each corrugation by bending said wire screen from one side of each corrugation to form an end surface, pressing said wire screen together to form a longitudinal crease near the crest of said corrugation, laying said pressed wire screen over the end surface of said corrugation and flattening said pressed wire screen to form a flat marginal area beyond said corrugation.

3. The method of shaping a wire screen member as claimed in claim 2 which includes the step of electroplating said wire screen member.

References Cited by the Examiner

UNITED STATES PATENTS

| | | | |
|---|---|---|---|
| 354,412 | 12/86 | Harrington | 29—555 |
| 1,186,917 | 6/16 | Larkin | 29—555 |
| 2,002,936 | 5/35 | Davies | 55—521 X |
| 2,011,303 | 8/35 | Schulz | 55—521 X |
| 2,457,958 | 1/49 | Walker | 210—493 |
| 2,510,024 | 5/50 | Mayer | 153—76 |
| 2,897,971 | 8/59 | Gewiss | 210—493 |

FOREIGN PATENTS 634,217  3/50  Great Britain.

WHITMORE A. WILTZ, *Primary Examiner.*

HYLAND BIZOT, *Examiner.*